United States Patent
Chang

(10) Patent No.: US 6,286,069 B1
(45) Date of Patent: Sep. 4, 2001

(54) DEVICE WHICH USES NOP COMMAND TO SHARE MEMORY BUS

(75) Inventor: Nai-Shung Chang, Yung-Ho (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/270,029

(22) Filed: Mar. 16, 1999

(30) Foreign Application Priority Data

Dec. 9, 1998 (TW) .................................................. 87120423

(51) Int. Cl.$^7$ ..................................................... G06F 13/00
(52) U.S. Cl. ........................ 710/107; 710/126; 710/129; 713/1; 713/100; 711/170; 711/173; 345/132; 345/508; 345/516
(58) Field of Search ..................................... 710/129, 126; 713/107, 100; 711/173, 170; 345/508, 132, 516

(56) References Cited

U.S. PATENT DOCUMENTS

| | | | |
|---|---|---|---|
| 5,659,690 | * 8/1997 | Stuber et al. | 710/129 |
| 5,953,746 | * 9/1999 | Crocker et al. | 711/173 |
| 6,148,398 | * 11/2000 | Chang et al. | 713/1 |
| 6,160,561 | * 12/2000 | Klein | 345/508 |

\* cited by examiner

*Primary Examiner*—Rupal Dharia
(74) *Attorney, Agent, or Firm*—Jiawei Huang; J.C. Patents

(57) ABSTRACT

A device which uses an NOP command to share a memory bus. The device includes a chipset, wherein a peripheral control circuit and a memory control circuit are integrated into the chipset. The peripheral control circuit and the memory control circuit share a plurality of pins in the chipset. A memory bus is connected to the chipset by the pins in the chipset. A peripheral device receives data sent from the peripheral control circuit through the memory bus. A drive circuit is connected to the memory bus. A main memory is connected to the memory bus.

17 Claims, 2 Drawing Sheets

DEVICE WHICH USES NOP COMMAND TO SHARE MEMORY BUS

CROSS-REFERENCE TO RELATED APPLICATION

This application claims the priority benefit of Taiwan application serial no. 87120423, filed Dec. 9, 1998, the frill disclosure of which is incorporated herein by reference.

BACKGROUND OF THE INVENTION

1. Field of the Invention

The present invention relates to a device which shares a memory bus. More particularly, the present invention relates to a device which uses a no operation (NOP) command to share a memory bus, which can reduce a size of a chipset and manufacturing costs of the chipset.

2. Description of the Related Art

FIG. 1 is a block diagram of a conventional computer architecture.

Referring to FIG. 1, a computer 100 includes a microprocessor 110, a chipset 120, a main memory 130 and a peripheral device 140. The microprocessor 110 is a central processing unit (CPU) or a CPU and a circuit related to it. The chipset 120 is an integration of circuits in the computer 100. The microprocessor 110 accesses data stored in the main memory 130 and communicates the data to the peripheral device 140 through the chipset 120. The main memory 130 stores programs and data used by the microprocessor 110. The main memory 130 includes synchronous dynamic random access memory (SDRAM). Commands used for SDRAM include precharge, read, write activate and no operation (NOP). The peripheral device 140 includes a hard disk, a floppy disk or a RS232 interface.

Although the circuit in the chipset can be complex in design to that it has many functions, the pin count of the chipset is limited by the size of the chipset.

In general, the chipset is a ball-grid array device having 492 pins. Two sets of control circuits are usually integrated into the device, in which one is a memory control circuit and the other is a graphic control circuit, to decrease manufacturing costs. However, the pin count of the chipset has risen to 556 as other peripheral control circuits have been integrated into the chipset. The manufacturing costs are increased and the size of the chipset is also increased.

SUMMARY OF THE INVENTION

Accordingly, the present invention provides a device which uses an NOP command to share a memory bus so that the problems of increasing the manufacturing costs and increasing the size of the chipset are avoided.

To achieve these and other advantages and in accordance with the purpose of the invention, as embodied and broadly described herein, the invention provides a device which uses an NOP command to share a memory bus. The device includes a chipset in which a peripheral control circuit and a memory control circuit are integrated. The peripheral control circuit and the memory control circuit share a plurality of pins in the chipset. A memory bus is connected to the chipset by the pins in the chipset. A peripheral device receives data sent from the peripheral control circuit through the memory bus. A drive circuit is connected to the memory bus. A main memory is connected to the memory bus.

The device according to the invention uses the NOP command to meet the function of multi-function Switching. When the drive circuit detects the NOP command pass through the memory bus, the drive circuit catches the NOP command and drives the peripheral device. When the microprocessor accesses the data stored in the main memory, the memory control circuit sends other commands to the main memory through the memory bus, and the drive circuit continuously detects the commands passing through the memory bus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
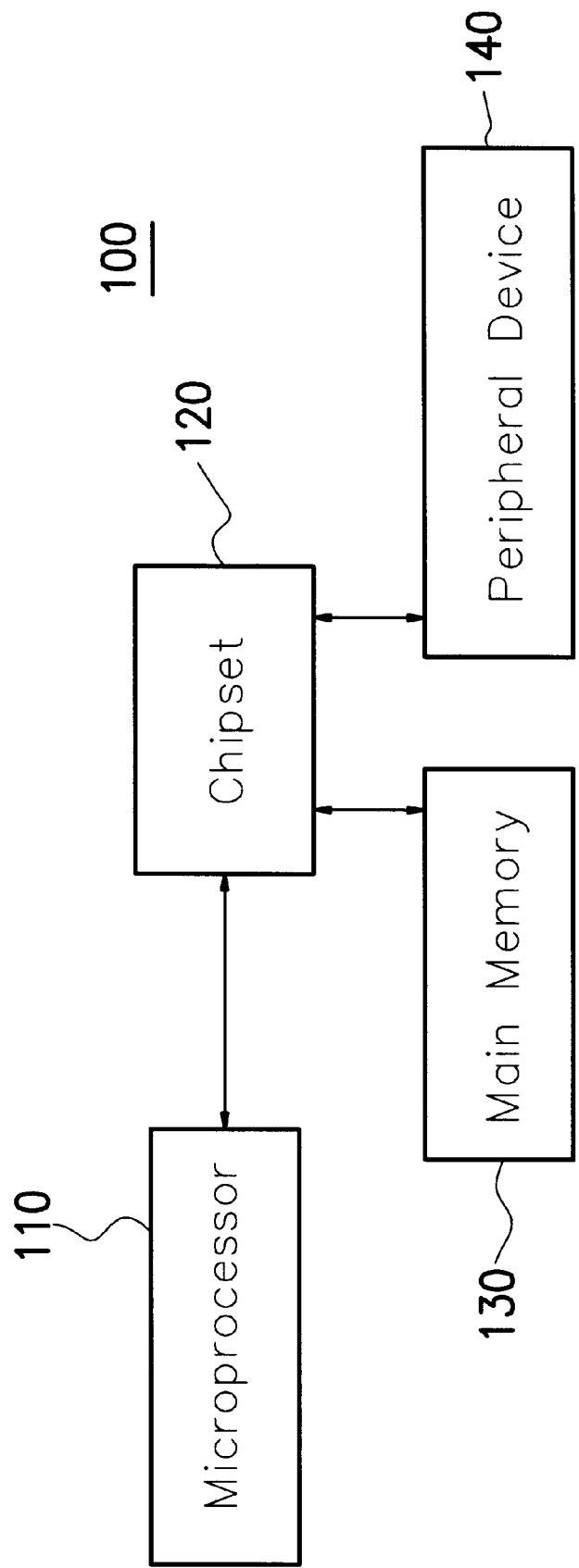
FIG. 1 is a block diagram of a conventional computer architecture.

Reference will now be made in detail to the present preferred embodiments of the inventions examples of which are illustrated in the accompanying drawings. Wherever possible, the same reference numbers are used in the drawings and the description to refer to the same or like parts.

Figure 2:
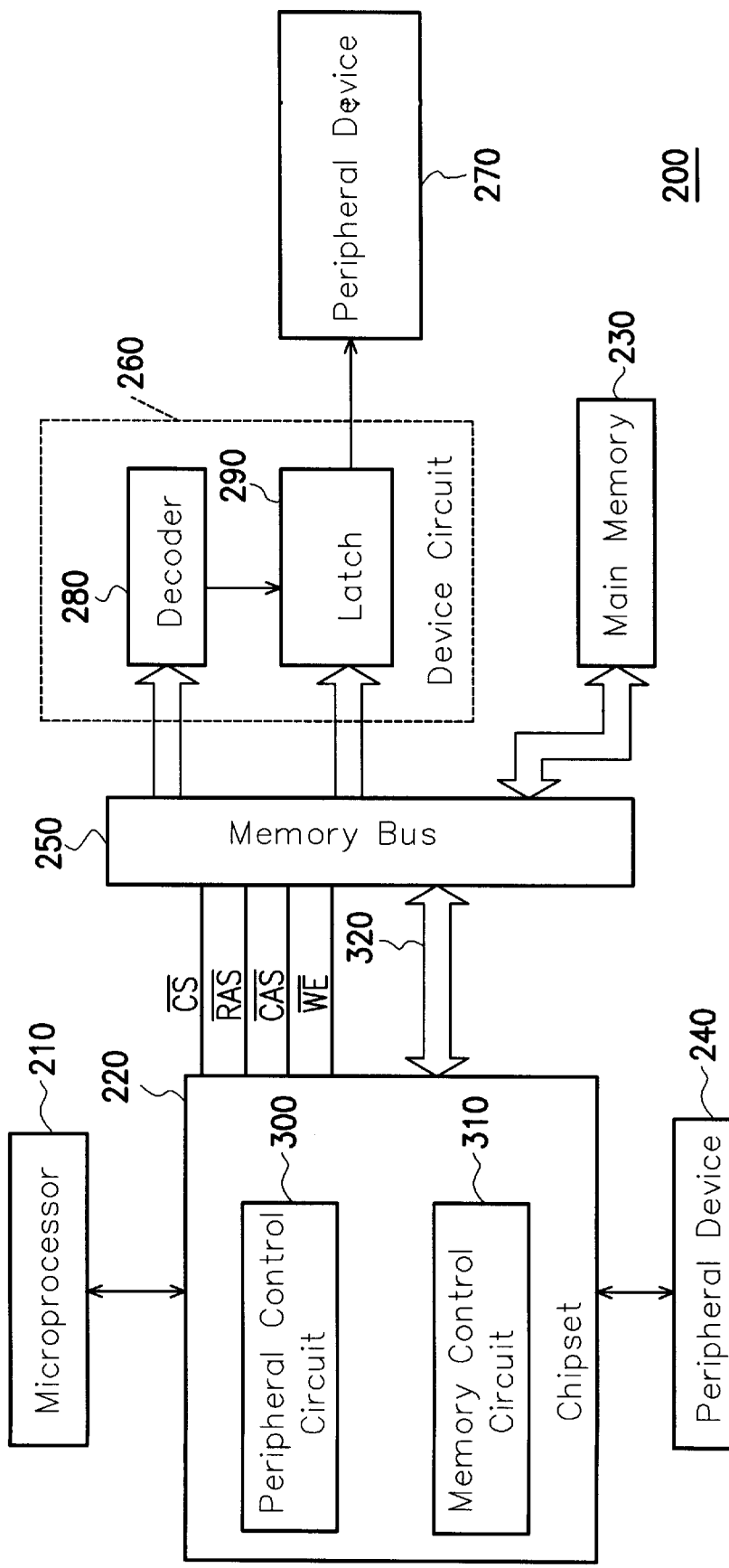
FIG. 2 is a block diagram of a device which shares a memory bus, according to the invention.

FIG. 2 is a block diagram of a device which shares a memory bus, according to the invention. The device is especially suitable for a unified memory architecture (UMA) computer.

Referring to FIG. 2, a device 200 includes a microprocessor 210, a chipset 220, a main memory 230), a memory bus 250, a drive circuit 260 and peripheral devices 240. 270. A peripheral control circuit 300 and a memory control circuit 310 are integrated into the chipset 220, wherein the memory control circuit 310 includes a memory control circuit and a graphic control circuit. The peripheral control circuit 300 and the memory control circuit 100 share a plurality of pins 320 in the chipset 220, and both connect to tile memory bus 250 through the pins 320. Thus, only one circuit of those circuits can be connected to the memory bus 250 through the pins 320 at any given time. The drive circuit 260 includes a decoder 280 such as an NAND gate and a latch 290. The peripheral device 70 is a device whose transmission rate or refresh rate is slow, such as a thin film transistor (TFT) liquid crystal display (LCD) or a television decoder/encoder. Thus, the performance of the main memory 230 is not affected by the peripheral device 270.

The microprocessor 210 and the peripheral device 240 are connected by the chipset 220. The microprocessor 210 includes a CPU or a CPU and a circuit related to it. The microprocessor 210 accesses data stored in the main memory 230 through the memory control circuit 310 and communicates the data to the peripheral device 240. The main memory 230 includes a SDRAM. The peripheral device 240 includes a hard disk, a floppy disk, a RS232 interface and other interfaces.

The operation step of the device 200 includes the following steps. The memory control circuit 310 sends commands to the main memory 230 through the memory bus 250 when the microprocessor 210 accesses the data stored in the main memory 230. The decoder 280 continuously detects the commands as they pass through the memory bus 250. When the decoder 280 detects an NOP command passing through the memory bus 250, wherein the NOP command includes other kinds of no operation commands, the decoder 280 is activated to perform some operations. The device 200 uses the NOP command to meet the function of multi-function switching. The command truth table used in the memory device such as a SDRAM is listed below.

Command Truth Table

|  | CKE | | | | | | | | |
| --- | --- | --- | --- | --- | --- | --- | --- | --- | --- |
|  | n − 1 | N | $\overline{CS}$ | $\overline{RAS}$ | $\overline{CAS}$ | $\overline{WE}$ | A11 | A10 | A9–A0 |
| DESL | H | X | H | X | X | X | X | X | X |
| NOP | H | X | L | H | H | H | X | X | X |
| BST | H | X | L | H | H | L | X | X | X |
| READ | H | X | L | H | L | H | V | L | V |
| READA | H | X | L | H | L | H | V | H | V |
| WRIT | H | X | L | H | L | L | V | L | V |
| WRITA | H | X | L | H | L | L | V | H | V |
| ACT | H | X | L | L | H | H | V | V | V |
| PRE | H | X | L | L | H | L | V | L | X |
| PALL | H | X | L | L | H | L | X | H | X |
| MRS | H | X | L | L | L | L | L | L | V |

H: High level,
L: Low level,
X: High level or Low level,
V: Valid data input

When the decoder 280 detects the NOI command passing through the memory bus 250, wherein the NOP command is sent from the peripheral control circuit 300 for example, the decoder 280 catches the NOP command and sends an enable signal to the latch 290. The NOP command indicates a situation in which a chip select signal $\overline{CS}$ is at a low level and a row address strobe signal $\overline{RAS}$, a column address strobe signal $\overline{CAS}$ and a write enable signal $\overline{WE}$ are all at a high level.

The latch 290 latches data sent from the peripheral circuit 300 and sends the data 10 to the peripheral device 270 so that the peripheral device 270 is driven by the latch 290. After driving the peripheral device 270, another operation accessing the data stored in the main memory 230 can be performed. Because the peripheral control circuit 300 and the memory control circuit 310 share the pins 320, only one circuit can be connected to the memory bus 250 through the pins 320 at any given time. In other words, when one of those circuits is connected to the memory bus 250 through the pins 320, the other circuit is idle.

Although the peripheral control circuit 300 and the memory control circuit 310 share the pins 320, it is not necessary to increase the pin count of the chipset 220. In this manner, problems of increasing the pin count of the chipset and increasing the size of the chipset are avoided.

The device according to the invention uses the NOP command to meet the function of multi-function switching. When the drive circuit detects the NOP command pass through the memory bus, the drive circuit catches the NOP command and drives the peripheral device. When the microprocessor accesses the data stored in the main memory, the memory control circuit sends other commands to the main memory through the memory bus, and the drive circuit continuously detects the commands passing, through the memory bus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the Following claims and their equivalents.

What is claimed is:

1. A device which shares a memory bus by using an NOP command comprising:
   a chipset, wherein a peripheral control circuit and a memory control circuit are integrated into the chipset, and the peripheral control circuit and the memory control circuit share a plurality of pins in the chipset;
   a memory bus connected to the pins in the chipset;
   a peripheral device which receives first data sent from the peripheral circuit;
   a drive circuit connected to the memory bus, wherein the drive circuit drives the peripheral device; and
   a main memory, which stores a program and second data used by a microprocessor connected to the memory bus, wherein the drive circuit catches the NOP command and drives the peripheral device when the drive circuit detects an NOP command pass though the memory bus, and the memory control circuit sends other commands to the main memory through the memory bus when the microprocessor accesses the second data stored in the main memory, and the drive circuit continuously detects the commands passing through the memory bus.

2. The device of claim 1, wherein the total pin count of the chipset is 492.

3. The device of claim 1, wherein the drive circuit comprises
   a decoder connected to the memory bus, wherein the decoder receives an NOP command and sends an enable signal; and
   a latch connected to the memory bus and the peripheral device, wherein the latch receives the enable signal and drives the peripheral device.

4. The device of the claim 3, wherein the decoder includes an NAND gate.

5. The device of claim 1, wherein the peripheral device includes a thin film transistor liquid crystal display.

6. The device of claim 1, wherein the peripheral device includes a television decoder/encoder.

7. The device of claim 1, wherein the peripheral device includes a device whose transmission rate is slow.

8. The device of claim 1, wherein the peripheral device includes a device whose refresh rate is slow.

9. The device of claim 1, wherein the microprocessor includes a central processing, unit.

10. The device of claim 1, wherein the main memory includes a synchronous dynamic random access memory.

11. The device of claim 1, wherein the NOP command includes other kinds of no operation commands.

12. The device of claim 1, wherein the NOP command is sent from the peripheral control circuit.

13. A method of sharing a memory bus between a memory and a peripheral
   device comprising the steps of:
   continuously detecting commands through the memory bus during normal memory operations;
   sending a NOP command onto the memory bus to utilize a peripheral device; and sending data to the peripheral device when detecting an NOP command.

14. The method of claim 1, wherein a drive circuit detects commands through the memory bus.

15. The method of claim 1, wherein a chipset sends the NOP command to utilize a peripheral device.

16. The method of claim 14, wherein the chipset includes a peripheral control circuit, and a memory control circuit.

17. The method of claim 1, wherein a drive circuit latches the data for the peripheral device and drives the peripheral device.

\* \* \* \* \*